United States Patent
Trombley et al.

(10) Patent No.: US 8,977,440 B2
(45) Date of Patent: Mar. 10, 2015

(54) BODY MOVEMENT MITIGATION IN EARTH-MOVING VEHICLES

(75) Inventors: Jason Trombley, Metamora, MI (US); William Calihan, Oxford, MI (US)

(73) Assignee: Robert Bosch GmbH, Stuttgart (DE)

( * ) Notice: Subject to any disclaimer, the term of this patent is extended or adjusted under 35 U.S.C. 154(b) by 846 days.

(21) Appl. No.: 12/878,379

(22) Filed: Sep. 9, 2010

(65) Prior Publication Data

US 2012/0065846 A1 Mar. 15, 2012

(51) Int. Cl.
*E02F 9/22* (2006.01)
*B60G 17/016* (2006.01)

(52) U.S. Cl.
CPC .............. *E02F 9/2207* (2013.01); *E02F 9/2296* (2013.01); *E02F 9/2257* (2013.01); *B60G 17/016* (2013.01)
USPC ................................ 701/50; 701/38; 340/685

(58) Field of Classification Search
USPC ................................ 701/50, 38, 124; 340/685
See application file for complete search history.

(56) References Cited

U.S. PATENT DOCUMENTS

| | | | | |
|---|---|---|---|---|
| 5,528,843 | A * | 6/1996 | Rocke | 701/50 |
| 5,832,730 | A * | 11/1998 | Mizui | 60/469 |
| 6,496,765 | B1 * | 12/2002 | Robinett et al. | 701/50 |
| 6,505,574 | B1 * | 1/2003 | Naud et al. | 114/268 |
| 6,817,277 | B2 | 11/2004 | Yoshino | |
| 7,140,830 | B2 | 11/2006 | Berger et al. | |
| 7,308,789 | B2 | 12/2007 | Lee | |
| 2006/0276948 | A1 | 12/2006 | Toda | |
| 2007/0168100 | A1 | 7/2007 | Danko | |
| 2007/0299589 | A1 * | 12/2007 | Gianoglio et al. | 701/50 |
| 2008/0234902 | A1 | 9/2008 | Johnson et al. | |
| 2008/0263911 | A1 | 10/2008 | Shoenmaker et al. | |
| 2009/0222176 | A1 | 9/2009 | Florean et al. | |
| 2010/0089855 | A1 * | 4/2010 | Kjolseth | 212/276 |
| 2010/0230370 | A1 * | 9/2010 | Schneider et al. | 701/50 |

FOREIGN PATENT DOCUMENTS

JP 5163746 6/1993

* cited by examiner

*Primary Examiner* — Tuan C. To
*Assistant Examiner* — Dale W Hilgendorf
(74) *Attorney, Agent, or Firm* — Michael Best & Friedrich LLP

(57) ABSTRACT

A heavy-duty vehicle including a movable arm, an operator control unit, an inertial measurement device, and a controller. The operator control unit directs movement of the movable arm. The inertial measurement device measures a pitch motion and a heave motion of the heavy-duty vehicle. The controller mitigates pitch motion and heave motion by adjusting a movement of the movable arm. The inertial measurement device detects a motion in one of a first direction and a second direction. The controller determines a direction of movement of the arm in one of a third direction and a fourth direction. The controller increases the speed of motion of the arm when the motion is in the first direction and the movement is in the third direction or when the motion is in the second direction and the movement is in the fourth direction.

19 Claims, 5 Drawing Sheets

BODY MOVEMENT MITIGATION IN EARTH-MOVING VEHICLES

BACKGROUND

The present invention relates to systems and methods of mitigating movement of a vehicle body. More specifically, the present invention relates to mitigating pitch and heave in earth-moving vehicles and similar machines.

Construction and earth-moving vehicles (e.g., front loaders, excavators, bull dozers, cranes, etc.) operate on unimproved surfaces and off-road conditions. In addition, such vehicles generally have minimal or no suspension. Thus, traveling over the unimproved surfaces or lifting a load can result in pitching and/or heaving. This pitching and/or heaving can result in the contents of a bucket spilling, discomfort and fatigue for a driver/operator of the machine, and increased chassis loading potentially leading to premature malfunctions.

SUMMARY

A variety of names are used to refer to vehicles such as the ones described above. The terms "heavy equipment" and heavy-duty vehicles are often used to refer to vehicles designed for executing construction tasks and earth moving. The term "heavy-duty vehicle" will be used herein to refer generically to such machines.

In one embodiment, the invention provides a heavy-duty vehicle. The heavy-duty vehicle includes a movable arm, an operator control, an inertial measurement device, and a controller. The operator control directs movement of the movable arm. The inertial measurement device measures a pitch motion and a heave motion of the heavy-duty vehicle. The controller is coupled to the operator control unit and the inertial measurement device, and mitigates pitch motions and heave motions by adjusting a movement of the movable arm. The inertial measurement device detects a motion in one of a first direction and a second direction and determines a direction of movement of the arm (e.g., in one of a third direction and a fourth direction). The controller increases the speed of motion of the arm when the motion is in the first direction and the movement is in the third direction or when the motion is in the second direction and the movement is in the fourth direction.

In another embodiment the invention provides a method of mitigating pitch and heave motions in a heavy-duty vehicle by detecting at least one of a pitch motion and a heave motion of the heavy-duty vehicle, determining a direction of a movement of a moveable arm of the heavy-duty vehicle, and altering the movement of the moveable arm to mitigate the detected motion.

Other aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

Figure 1:
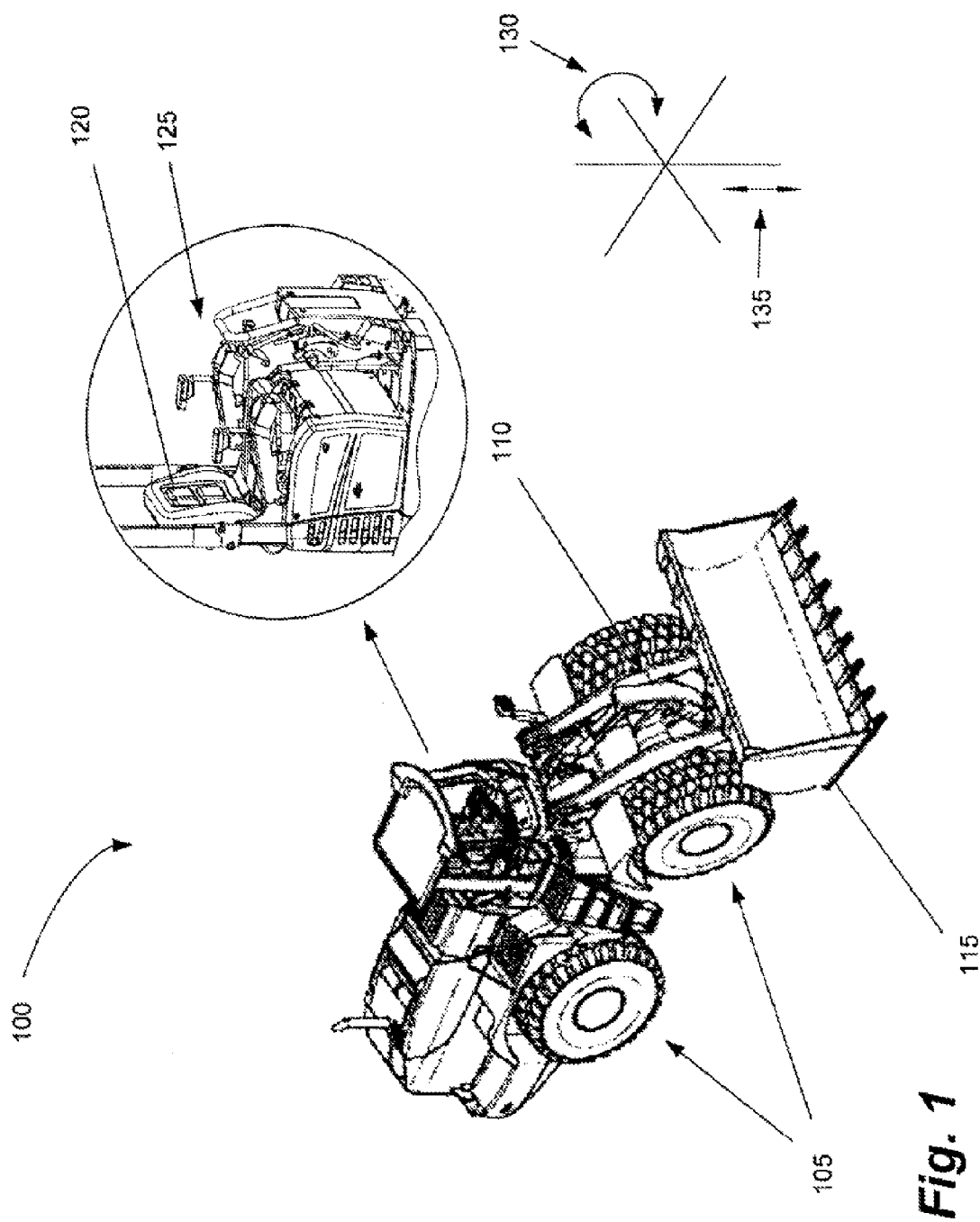
FIG. 1 is a plan view of a front loader.

FIG. 1 shows a heavy-duty vehicle (e.g., a front loader 100). The front loader 100 includes a two axles (at least one of which is driven) 105, an articulating arm (or boom) 110 with a shovel (or bucket) 115, a driver's seat 120, and various controls 125. During operation, the front loader 100 is subjected to pitch motions (i.e., roll around a horizontal axis) depicted by arrow 130 and to heave motions (i.e., accelerations in a vertical direction, i.e., up and down) depicted by arrow 135. These motions can be caused by a number of factors including the raising and/or lowering of the articulated arm 110, and movement of the front loader 100, especially over uneven ground. These motions can result in contents of the bucket spilling, wear and tear on the front loader 100, and discomfort/fatigue for the operator.

Figure 2:
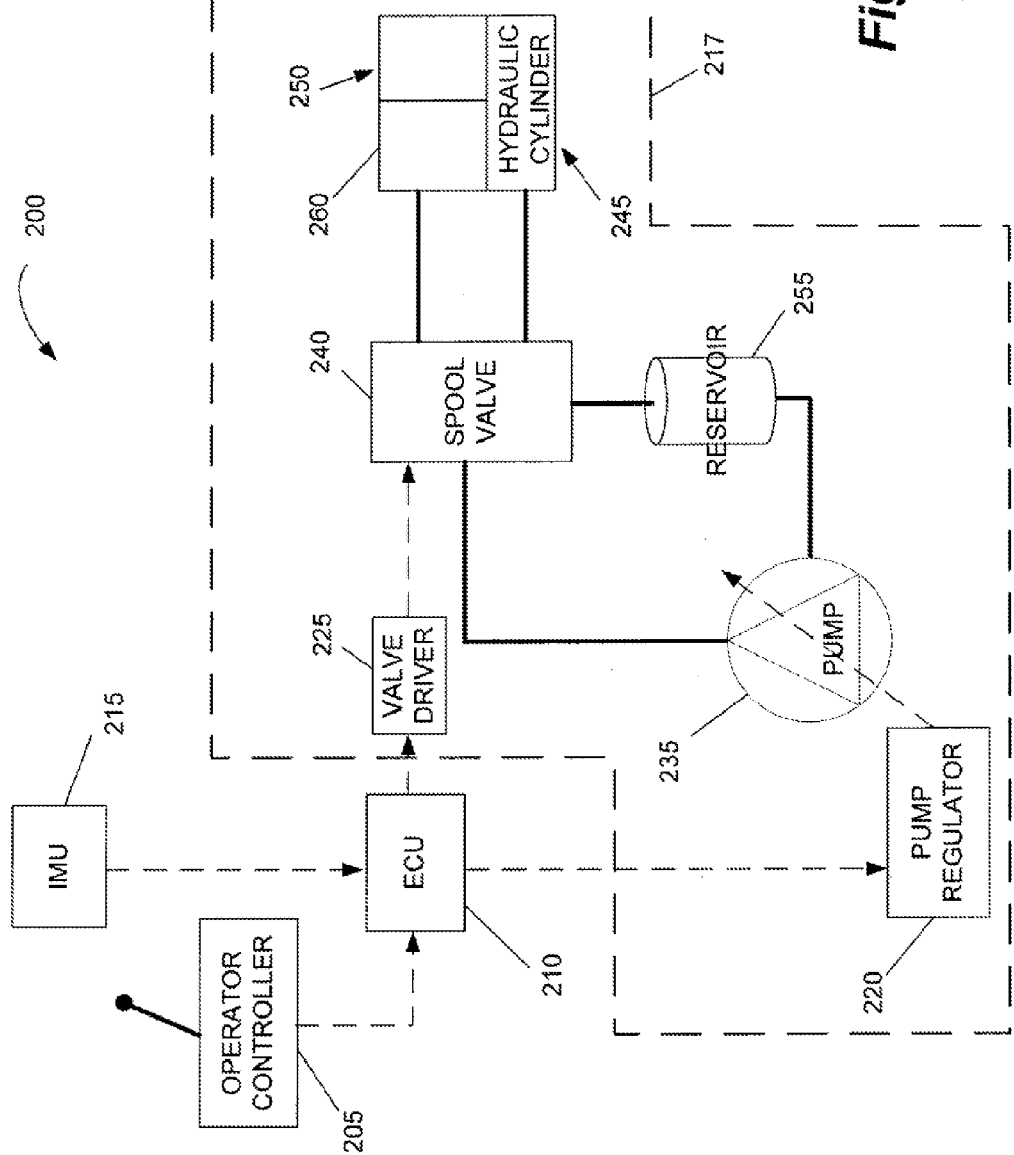
FIG. 2 is a block diagram of a control system for implementing the invention.

FIG. 2 shows a schematic diagram of a control system 200 for a heavy-duty vehicle incorporating closed-loop control for mitigating pitch and heave in a heavy-duty vehicle. Electrical connections are shown with dashed lines. Hydraulic connections are shown with solid lines. In the embodiment shown, the control system 200 controls the articulating arm 110 using hydraulics. Other embodiments include different systems such as pneumatic, electric, etc. for controlling the articulating arm 110. The system 200 includes an operator control unit 205, an electronic control unit (ECU) 210, an inertial measurement unit 215, and a hydraulic system 217 including a pump regulator 220, a valve driver 225, a pump 235, a spool valve 240 having a first end 245 and a second end 250, a fluid reservoir 255, and a hydraulic cylinder 260. The inertial measurement unit 215 incorporates one or more accelerometers, gyroscopes, or other devices capable of detecting motion.

The ECU 210 receives a signal from the operator control unit 205 indicating whether the operator wants to raise or lower the articulating arm 110. The ECU 210 also receives a signal from the inertial measurement unit 215 indicative of movement of the heavy-duty vehicle (e.g., pitch and heave). Based on the various signals the ECU 210 receives, the ECU 210 generates signals or commands to move the spool valve 240 in a first direction or a second direction (via the valve driver 225) and controls the pump 235 (via the pump regulator 220). By moving the spool valve 240 in a first direction, and running the pump 235, the ECU 210 causes hydraulic fluid to flow into the first end 245 of the hydraulic cylinder 260 raising the articulating arm 110. Hydraulic fluid flows out of the second end 250 of the hydraulic cylinder 260, through the spool valve 240 and into the fluid reservoir 255. Based on the input from the operator control unit 205, the ECU 210 controls the speed of the pump 235 to control how quickly the arm 110 is raised.

Similarly, the ECU 210, based on an input from the operator control unit 205, can move the spool valve 240 in a second direction and run the pump 235, resulting in hydraulic fluid flowing into the second end 250 of the hydraulic cylinder 260 lowering the articulating arm 110. Hydraulic fluid flows out of the first end 245 of the hydraulic cylinder 260, through the spool valve 240 and into the fluid reservoir 255. Based on the input from the operator control unit 205, the ECU 210 controls the speed of the pump 235 to control how quickly the arm 110 is lowered.

The ECU 210 receives feedback from the inertial measurement unit 215 indicative of the impact of the ECU's 210 control of the spool valve 240 and the pump 235, resulting in the control system 200 operating as a closed loop control.

Figure 3A:
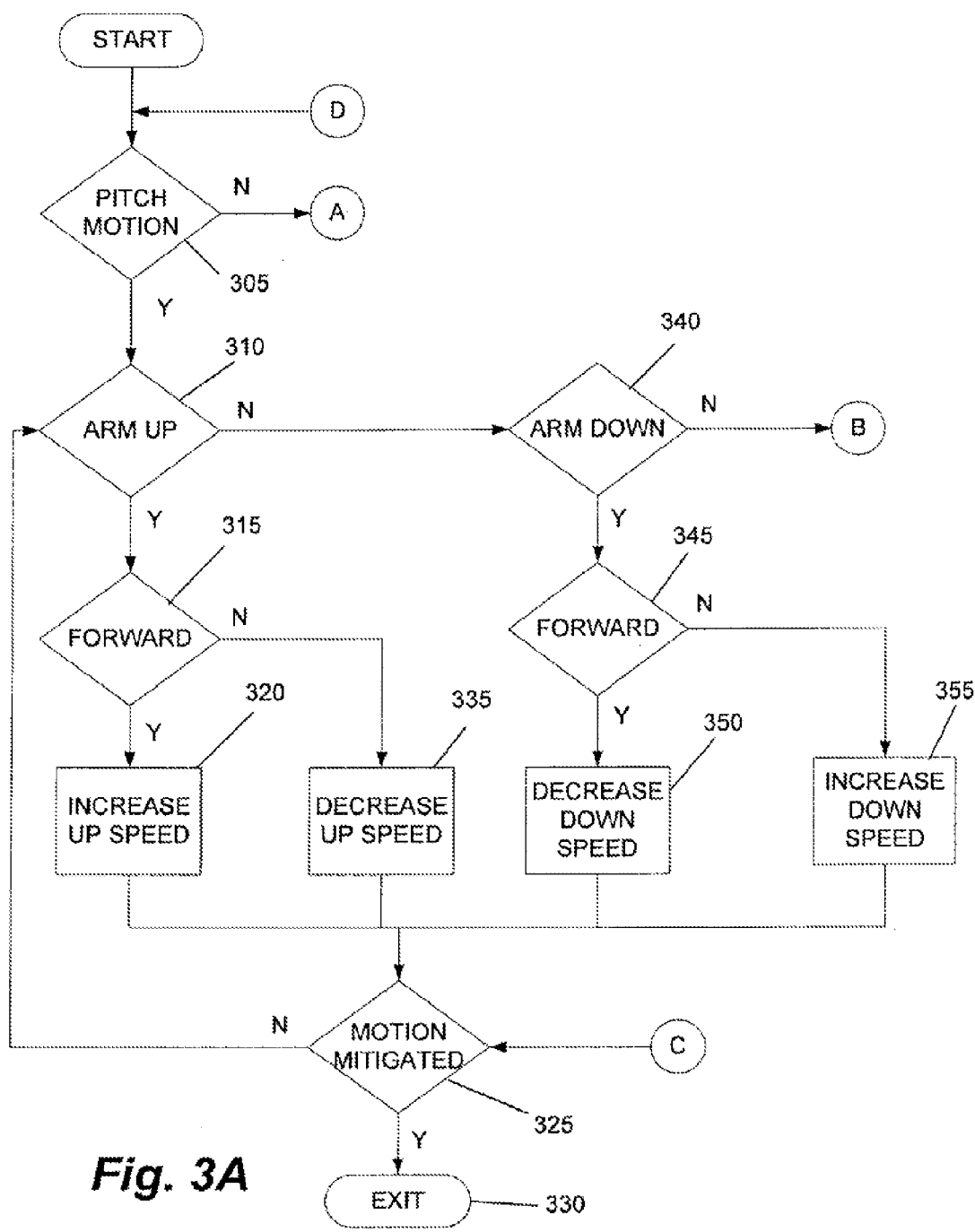
FIGS. 3A-3C illustrate an operation for mitigating pitch and heave in a heavy-duty vehicle.
Figure 3B:
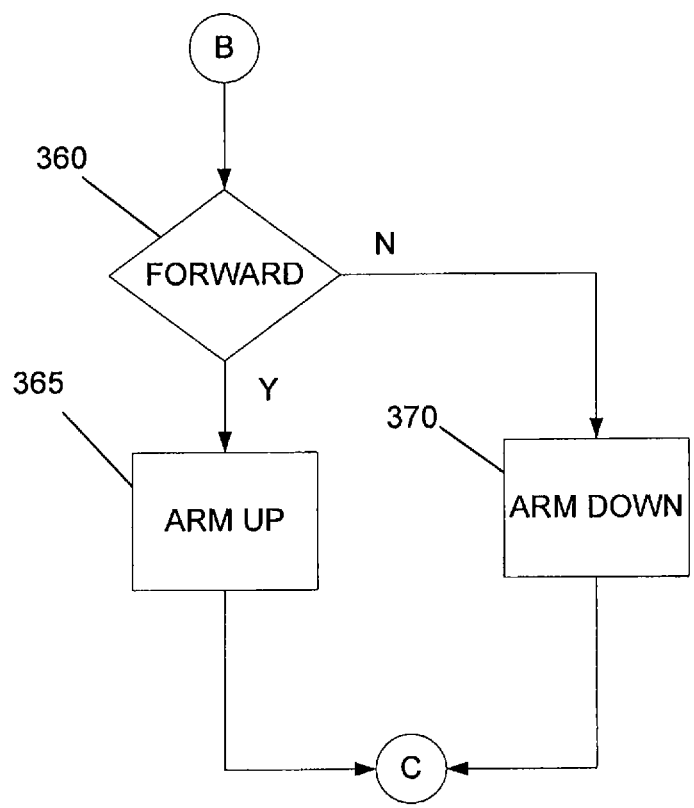
Figure 3C:
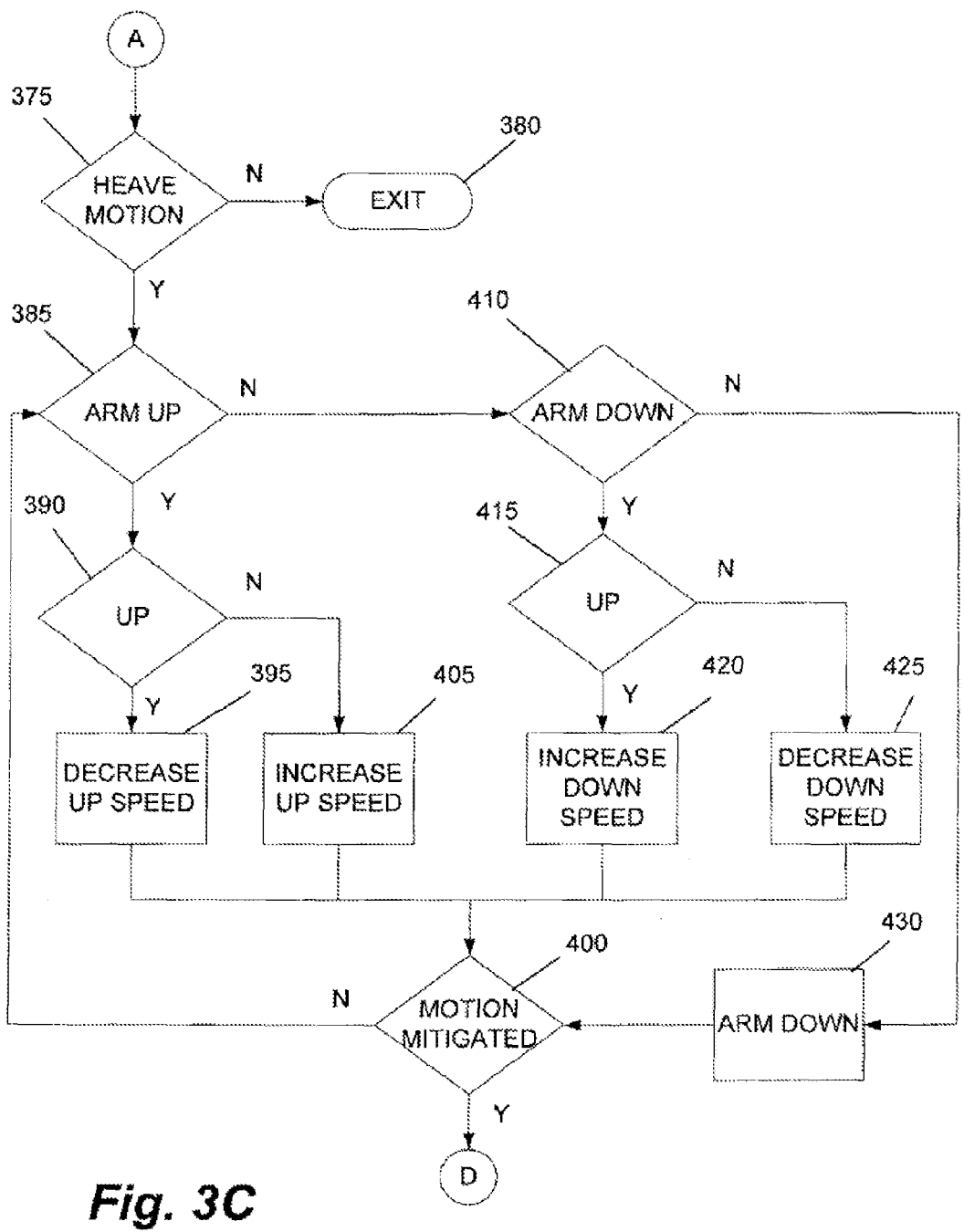

FIGS. 3A to 3C show an embodiment of the operation of the system 200 to mitigate pitch and heave motions in a heavy-duty vehicle. The ECU 210 determines if the inertial measurement unit 215 has detected a pitch motion (e.g., movement in a first pitch direction, i.e., forward, around a horizontal axis or movement in a second pitch direction, i.e., backward, around a horizontal axis) (step 305). If there is a pitch motion, the ECU 210 checks if the operator is attempting to raise the articulating arm 110 (i.e., move the articulating arm 110 in a third direction) (step 310). That is, the ECU 210 determines if the operator input unit 205 is indicating that the operator is controlling an input indicating the operator wishes to raise the arm 110. If the operator is attempting to raise the arm 110, the ECU 210 checks if the pitch motion is in a forward direction (step 315). If the pitch motion is in the forward direction, the ECU 210 increases the speed of the arm in the up direction (step 320) to attempt to mitigate the forward pitch motion. If the motion is mitigated (step 325), the ECU 210 exits operation until the next cycle (e.g., time period) (step 330). If the motion was not mitigated at step 325, the ECU 210 continues operation at step 310.

If the pitch motion was backwards (step 315), the ECU 210 decreases the speed at which the arm is being raised (step 335) to attempt to mitigate the backward pitch motion. If the motion is mitigated (step 325), the ECU 210 exits operation until the next cycle (e.g., time period) (step 330). If the motion was not mitigated at step 325, the ECU 210 continues operation at step 310.

If the operator is not raising the arm 110 (step 310), the ECU 210 checks if the operator is attempting to lower the arm 110 (i.e., move the articulating arm 110 in a fourth direction) (step 340). If the operator is attempting to lower the arm 110, the ECU 210 checks if the pitch motion is in a forward direction (step 345). If the pitch motion is in the forward direction, the ECU 210 decreases the speed of the arm in the downward direction (step 350) to attempt to mitigate the forward pitch motion. If the motion is mitigated (step 325), the ECU 210 exits operation until the next cycle (e.g., time period) (step 330). If the motion was not mitigated at step 325, the ECU 210 continues operation at step 310.

If the pitch motion was backwards (step 345), the ECU 210 increases the speed at which the arm is being lowered (step 355) to attempt to mitigate the backward pitch motion. If the motion is mitigated (step 325), the ECU 210 exits operation until the next cycle (e.g., time period) (step 330). If the motion was not mitigated at step 325, the ECU 210 continues operation at step 310.

If the arm is not being raised (step 310) nor lowered (step 340), the ECU 210 determines whether the pitch motion is forward (step 360, FIG. 3B). If the motion is forward, the ECU 210 raises the arm 110 up in an attempt to mitigate the motion (step 365) even though the operator is not attempting to raise the arm 110. The ECU 210 then continues operation at step 325 with determining if the motion has been mitigated. If the motion at step 360 was not forward (i.e., was backward), the ECU 210 lowers the arm 110 in an attempt to mitigate the motion (step 370) even though the operator is not attempting to lower the arm 110. The ECU 210 then continues operation at step 325 with determining if the motion has been mitigated.

If, the ECU 210 determines the inertial measurement unit 215 has not detected a pitch motion (e.g., movement around a horizontal axis) (step 305), the ECU 210 determines if the inertial measurement unit 215 has detected a heave motion (e.g., movement in a first heave direction, i.e., downward, or movement in a second heave direction, i.e., upward) (step 375, FIG. 3C). If there is not a heave motion, the ECU 210 exits the operation until the next cycle (e.g., time period) (step 380).

If there is a heave motion, the ECU 210 checks if the operator is attempting to raise the articulating arm 110 (step 385). If the operator is attempting to raise the arm 110, the ECU 210 checks if the heave motion is in an up direction (step 390). If the heave motion is in the up direction, the ECU 210 decreases the speed of the arm in the up direction (step 395) to attempt to mitigate the upward heave motion. If the motion is mitigated (step 400), the ECU 210 continues checking for pitch motion (step 305). If the motion was not mitigated at step 400, the ECU 210 continues operation at step 385, checking if the arm 110 is being raised.

If the heave motion was downward (step 390), the ECU 210 increases the speed at which the arm is being raised (step 405) in an attempt to mitigate the downward heave motion. If the motion is mitigated (step 400), the ECU 210 continues checking for pitch motion (step 305). If the motion was not mitigated at step 400, the ECU 210 continues operation at step 385, checking if the arm 110 is being raised.

If the operator is not attempting to raise the arm 110 (step 385), the ECU 210 checks if the operator is attempting to lower the arm 110 (step 410). If the operator is attempting to lower the arm 110, the ECU 210 checks if the heave motion is in an upward direction (step 415). If the heave motion is upward, the ECU 210 increases the downward speed of the arm (step 420) to attempt to mitigate the upward heave motion. If the motion is mitigated (step 400), the ECU 210 continues to check for pitch motion (step 305). If the motion was not mitigated at step 400, the ECU 210 continues operation at step 385, checking if the arm 110 is being raised.

If the heave motion was downward (step 415), the ECU 210 decreases the speed at which the arm is being lowered (step 425) to attempt to mitigate the downward heave motion. If the motion is mitigated (step 400), the ECU 210 continues to check for pitch motion (step 305). If the motion was not mitigated at step 400, the ECU 210 continues operation at step 385, checking if the arm 110 is being raised.

If the arm is not being raised (step 385) nor lowered (step 410), the ECU 210 lowers the arm 110 with a step input (step 430) to induce a pitch motion, and continues with checking if the heave motion has been mitigated (step 400).

In some embodiments, the system 200 attempts to mitigate pitch and heave motions by controlling a position of the bucket 115, instead of or in addition to controlling the articulating arm 110. In some embodiments, the system 200 provides an indication to the operator (e.g., lighting a tell-tale lamp) that a pitch and/or heave motion has been detected, and that the system 200 is taking corrective action. In some embodiments, the system 200 takes into account the magnitude of the pitch and/or heave motion, accelerating countermeasures when the magnitude exceeds one or more thresholds and/or adjusting a speed of movement of the articulating arm 110 based on the magnitude of the pitch and/or heave motion.

Various features and advantages of the invention are set forth in the following claims.

What is claimed is:

1. A heavy-duty vehicle, comprising:
   a movable arm;
   an operator control unit configured to transmit a first set of signals indicating
   whether an operator of the heavy-duty vehicle is requesting a movement of the moveable arm in an up direction or in a down direction, and
   a speed of the movement of the moveable arm; and a closed loop control system including
an inertial measurement device configured
to detect and measure a motion of the heavy-duty vehicle, and
to transmit a second set of signals indicating whether
the motion of the heavy-duty vehicle is a pitch motion or a heave motion, and
the motion of the heavy-duty vehicle is in a first direction or in a second direction, and
a controller coupled to the operator control unit and the inertial measurement device, the controller configured
to receive the first set of signals and the second set of signals, and
to increase the speed of the movement of the moveable arm when the first set of signals indicates that the operator requested movement of the moveable arm is in the up direction and the second set of signals indicates that the motion of the heavy-duty vehicle is in the first direction, and
to increase the speed of the movement of the moveable arm when the first set of signals indicates that the operator requested movement of the moveable arm is in the down direction and the second set of signals indicates that the motion of the heavy-duty vehicle is in the second direction,
wherein the pitch motion is a roll around a horizontal axis and the heave motion is an acceleration in a vertical direction.

2. The heavy-duty vehicle of claim 1, further comprising a hydraulic system coupled to the controller and configured to move the arm in response to commands received from the controller.

3. The heavy-duty vehicle of claim 1, wherein the inertial measurement device includes an accelerometer.

4. The heavy-duty vehicle of claim 1, wherein the inertial measurement device includes a gyroscope.

5. The heavy-duty vehicle of claim 1, wherein when the second set of signals indicates that the motion of the heavy-duty vehicle is the pitch motion, the first direction is forward and the second direction is backward.

6. The heavy-duty vehicle of claim 1, wherein when the second set of signals indicates that the motion of the heavy-duty vehicle is the heave motion, the first direction is down and the second direction is up.

7. The heavy-duty vehicle of claim 1, wherein the controller is further configured to
decrease the speed of the movement of the moveable arm when the second set of signals indicates that the motion of the heavy-duty vehicle is in the second direction and the first set of signals indicates that the movement of the moveable arm is in the up direction, and
decrease the speed of the movement of the moveable arm when the second set of signals indicates that the motion of the heavy-duty vehicle is in the first direction and the first set of signals indicates that the movement of the moveable arm is in the down direction.

8. The heavy-duty vehicle of claim 7, wherein when the second set of signals indicates that the motion of the heavy-duty vehicle is the pitch motion, the first direction is forward and the second direction is backward.

9. The heavy-duty vehicle of claim 7, wherein when the second set of signals indicates that the motion of the heavy-duty vehicle is the heave motion, the first direction is down and the second direction is up.

10. The heavy-duty vehicle of claim 1, wherein the controller is further configured
to move the moveable arm in the up direction when
the second set of signals indicates that the motion of the heavy-duty vehicle is the pitch motion,
the first set of signals indicates that the speed of the movement of the moveable arm is zero, and
the second set of signals indicates that the motion of the heavy-duty vehicle is in a forward direction, and
to move the moveable arm in the down direction when
the second set of signals indicates that the motion of the heavy-duty vehicle is the pitch motion,
the first set of signals indicates that the speed of the movement of the moveable arm is zero, and
the second set of signals indicates that the motion of the heavy-duty vehicle is in a backward direction.

11. The heavy-duty vehicle of claim 1, wherein the controller is further configured to move the moveable arm in the down direction when the second set of signals indicates that the motion of the heavy-duty vehicle is the heave motion and the first set of signals indicates that the speed of the movement of the moveable arm is zero.

12. A method of mitigating at least one selected from a group including a pitch motion and a heave motion in a heavy-duty vehicle with a moveable arm, the method comprising:
detecting and measuring, by an inertial measurement device, a motion of the heavy-duty vehicle;
transmitting, by the inertial measurement device, a second set of signals indicating whether
the motion of the heavy-duty vehicle is the pitch motion or the heave motion, and
the motion of the heavy-duty vehicle is in a first direction or in a second direction;
transmitting, by an operator control unit, a first set of signals indicating
whether an operator of the heavy-duty vehicle is requesting a movement of the moveable arm in an up direction or in a down direction, and
a speed of the movement of the moveable arm;
receiving, by a controller, the first set of signals and the second set of signals;
increasing, by the controller, the speed of the movement of the moveable arm when the first set of signals indicates that the operator direction movement of the moveable arm is in the up direction and the second set of signals indicates that the motion of the heavy duty vehicle is in the first direction,
increasing, by the controller, the speed of the movement of the moveable arm when the first set of signals indicates that the operator direction movement of the moveable arm is in the down direction and the second set of signals indicates that the motion of the heavy duty vehicle is in the second direction,
wherein the pitch motion is a roll around a horizontal axis and the heave motion is an acceleration in a vertical direction.

13. The method of claim 12, wherein when the second set of signals indicates that the motion of the heavy-duty vehicle is the pitch motion, the first direction is forward and the second direction is backward.

14. The method of claim 12, wherein when the second set of signals indicates that the motion of the heavy-duty vehicle is the heave motion, the first direction is down and the second direction is up.

15. The method of claim 12, wherein the method further comprising
decreasing, by the controller, the speed of the movement of the moveable arm when the second set of signals indicates that the motion of the heavy-duty vehicle is in the second direction and the first set of signals indicates that the movement of the moveable arm in in the up direction; and decreasing, by the controller, the speed of the movement of the moveable arm when the second set of signals indicates that the motion of the heavy-duty vehicle is in the first direction and the first set of signals indicates that the movement of the moveable arm is in the down direction.

16. The method of claim 15, wherein when the second set of signals indicates that the motion of the heavy-duty vehicle is the pitch motion, the first direction is forward and the second direction is backward.

17. The method of claim 15, wherein when the second set of signals indicates that the motion of the heavy-duty vehicle is the heave motion, the first direction is down and the second direction is up.

18. The method of claim 12, further comprising moving, by the controller, the moveable arm in the up direction when the second set of signals indicates that the motion of the heavy-duty vehicle is the pitch motion, the first set of signals indicates that the speed of the movement of the moveable arm is zero, and the second set of signals indicates that the motion of the heavy-duty vehicle is in a forward direction; and moving, by the controller, the moveable arm in the down direction when the second set of signals indicates that the motion of the heavy-duty vehicle is the pitch motion, the first set of signals indicates that the speed of the movement of the moveable arm is zero, and the second set of signals indicates that the motion of the heavy-duty vehicle is in a backward direction.

19. The method of claim 12, further comprising moving, by the controller, the moveable arm in the down direction when the second set of signals indicates that the motion of the heavy-duty vehicle is the heave motion and the first set of signals indicates that the speed of the movement of the moveable arm is zero.

* * * * *